US012083663B2

(12) United States Patent
Airas

(10) Patent No.: US 12,083,663 B2
(45) Date of Patent: Sep. 10, 2024

(54) ROCK BREAKING MACHINE AND METHOD FOR STORING PRESSURE ENERGY

(71) Applicant: SANDVIK MINING AND CONSTRUCTION OY, Tampere (FI)

(72) Inventor: Erik Airas, Tampere (FI)

(73) Assignee: Sandvik Mining and Construction Oy, Tampere (FI)

(*) Notice: Subject to any disclaimer, the term of this patent is extended or adjusted under 35 U.S.C. 154(b) by 243 days.

(21) Appl. No.: 17/796,336

(22) PCT Filed: Jan. 29, 2021

(86) PCT No.: PCT/EP2021/052121
§ 371 (c)(1),
(2) Date: Jul. 29, 2022

(87) PCT Pub. No.: WO2021/152098
PCT Pub. Date: Aug. 5, 2021

(65) Prior Publication Data

US 2023/0069735 A1 Mar. 2, 2023

(30) Foreign Application Priority Data

Jan. 31, 2020 (EP) .................................... 20155036

(51) Int. Cl.
*B25D 9/14* (2006.01)
*F15B 1/04* (2006.01)

(52) U.S. Cl.
CPC ................ *B25D 9/145* (2013.01); *F15B 1/04* (2013.01); *B25D 2209/002* (2013.01); *B25D 2222/72* (2013.01); *B25D 2250/365* (2013.01)

(58) Field of Classification Search
CPC .................................. F15B 1/04; B25D 9/14
See application file for complete search history.

(56) References Cited

U.S. PATENT DOCUMENTS

| | | | |
|---|---|---|---|
| 5,893,419 | A | 4/1999 | Hodges |
| 7,328,753 | B2 | 2/2008 | Henriksson et al. |
| 2014/0020920 | A1 | 1/2014 | Tang et al. |

FOREIGN PATENT DOCUMENTS

| | | | |
|---|---|---|---|
| DE | 10003415 | A1 | 11/2001 |
| EP | 1559515 | A2 | 8/2005 |
| WO | 2005087448 | A1 | 9/2005 |

*Primary Examiner* — Praachi M Pathak
(74) *Attorney, Agent, or Firm* — Corinne R. Gorski

(57) ABSTRACT

A pressure accumulator, rock breaking machine and method of storing pressure energy. The accumulator includes a casing and an elastic membrane arranged inside the casing. The membrane divides an inner space of the casing into two separate pressure spaces. A gas space is prefilled with pressurized gas. On the opposite side of the membrane is a hydraulic space for receiving hydraulic fluid. The membrane is a hat-like element having side walls, a mounting flange at its open end and a closed top end. The mounting flange of the membrane is mounted between the casing and a flange element. The accumulator is without a screen. The flange element is provided with a sealing for sealing a piston.

11 Claims, 5 Drawing Sheets

ROCK BREAKING MACHINE AND METHOD FOR STORING PRESSURE ENERGY

RELATED APPLICATION DATA

This application is a § 371 National Stage Application of PCT International Application No. PCT/EP2021/052121 filed Jan. 29, 2021 claiming priority to EP 20155036.5 filed Jan. 31, 2020.

BACKGROUND OF THE INVENTION

The invention relates to a pressure accumulator. The pressure accumulator is mountable to a hydraulic system of a rock breaking machine and is intended to store pressure energy when a percussion piston of an impact device of the rock breaking machine moves in return direction.

The invention further relates to a rock breaking machine provided with a pressure accumulator for storing pressure energy during operation of the machine and its reciprocating percussion piston. Moreover, the invention relates to a method for storing pressure energy.

Breaking hammers are rock breaking machines which are used to break boulders, stones and other rock material. The breaking hammer comprises a percussion device for generating impact pulses to a breaking tool connectable to the breaking hammer. The breaking hammers are usually installed as auxiliary equipment in excavators instead of buckets and they are usually operated by the hydraulics of the base machine. Hydraulic breaking hammers as well as other rock breaking machines provided with impact devices employ different pressure accumulators for example to even pressure variations resulting from the cycle of operation of their impact devices. The pressure accumulators comprise a space, which is divided by means of a pressure-tight membrane into a gas space, containing pre-filled gas, and to a hydraulic space capable of receiving hydraulic fluid. When hydraulic fluid is supplied to the hydraulic space, it pushes the membrane towards the gas space, thus making the pre-filled gas on the opposite side of the membrane compress. Then the structure simultaneously stores energy that can be released, in order to supply the pressure fluid back to the hydraulic circuit. In this manner, a certain volume of pressurized fluid can be temporarily stored in the pressure accumulator. However, the known solutions have shown to include some disadvantages.

BRIEF DESCRIPTION OF THE INVENTION

An object of the invention is to provide a novel and improved rock breaking machine. A further object is to provide a novel and improved method of storing pressure energy in a rock breaking machine.

An idea of the disclosed solution is that the pressure accumulator comprises a casing defining an inner space inside which an elastic gas-tight membrane is arranged. The membrane divides the inner space into two separate pressure spaces. A gas space is prefilled with pressurized gas and a hydraulic space intended to receive hydraulic fluid. The membrane has radial side walls, edges at its open first axial end and a closed top end at its opposite second axial end. The edges of the membrane comprise a transverse mounting flange, whereby the membrane has a hat-like configuration. The edges of the membrane are mounted between the casing and the mounting flange is pressed in axial direction of the accumulator by means of the flange element. Further, the flange element comprises one or more pressure channels for feeding hydraulic fluid to the hydraulic space and for discharging hydraulic fluid. The pressure channels allow providing hydraulic fluid flow from a hydraulic operating system of the rock breaking machine to and out of the hydraulic space during the operation of the machine. An inner surface of the support portion of the flange element is provided with sealing elements for sealing an end portion of a percussion piston of the hydraulic rock breaking machine.

In other words, the disclosed accumulator is without a screen supporting the membrane, but instead only the lowermost part of the membrane is supported by means of the support portion of the flange element and the upper part of the membrane is without any mechanical support.

Further, in the disclosed screen-free or screen-less configuration the membrane is arranged between the casing and the flange element, whereby the casing, membrane and flange element are arranged successively in axial direction of the pressure accumulator.

An advantage of the disclosed solution is that the accumulator may have compact configuration since there is no screen inside it. In the disclosed screen free accumulator volume of the screen may be utilized for storing pressurized fluid inside it, instead of having dead screen volume. Further, the structure of the accumulator may be simple, lightweight and inexpensive when the screen has left out.

Since the membrane has the mounting flange, it is easy to handle and mount. Further, the fastening between the casing and the flange element is firm and reliable.

The membrane is made of elastic material and is configured to expand radially and axially inside a space between an inner surface of the casing and an outer surface of the flange element due to relative pressures prevailing in the gas space and the hydraulic space. Since there exist simultaneous expansion in axial and radial direction, expansion of the membrane may be relatively small and still desired hydraulic volume flows can be received inside the hydraulic space.

Since the pressure accumulator is located at a rear end portion of the rock breaking machine, i.e. at an opposite end relative to a tool side end of the machine, the accumulator is located at distance from the front end portion which may be subjected to external forces and harmful effects of dirt during the use of the machine. This is important especially when there is no protective casing around the percussion device. Furthermore, the accumulator is easy to mount and service when it is located at an extension of the machine. Service measures can be made at work site conditions since the accumulator is well accessible.

According to an embodiment, the accumulator is suitable to be used in a breaking hammer and in a rock drilling machine which both comprise hydraulically operable impact devices provided with reciprocating percussion pistons. The breaking hammers and drilling machines are intended for rock breaking. In other words, the term rock breaking machine includes hydraulic breaking hammers and hydraulic rock drilling machines.

According to an embodiment, the flange element comprises an annular mounting portion transverse to axial direction of the accumulator. The mentioned pressure channels for feeding and discharging hydraulic fluid are located at the mounting portion.

According to an embodiment, the flange element comprises a central sleeve-like support portion protruding axially inside the casing, whereby an outer surface of the support portion is configured to provide axial support for the membrane at least when the hydraulic rock breaking machine is non-pressurized. The support portion has a truncated configuration.

According to an embodiment, the casing of the accumulator is provided with a feed port for feeding pre-filling gas into the gas space, whereas the hydraulic space is connectable to operating hydraulic system of the hydraulic rock breaking machine.

According to an embodiment, the flange element of the accumulator is provided with hydraulic fluid conduits for feeding and discharging hydraulic fluid to and from the hydraulic space, whereby pressure of the hydraulic fluid inside the hydraulic space is configured to be adjusted during the operation of accumulator.

According to an embodiment, the edges of the membrane are pressed in axial direction of the accumulator between the casing and the flange element. Generated axial forces ensure pressure tight and firm fastening for the membrane. Furthermore, the casing and the membrane are easy to mount and dismount because of the applied axial mounting direction.

According to an embodiment, the edges of the membrane comprise a transverse mounting flange, whereby the membrane has a hat-like configuration. The mounting flange of the membrane extends radially away from the side walls and has an annular shape. In other words, the hat-like membrane has a cup-shaped part and a brim surrounding its open end portion.

According to an embodiment, the mounting flange of the membrane is provided with at least one protrusion at least on one side of the flange and is serving as a sealing element. Further, at least one of the axial mounting surfaces between the casing and the flange element is provided with a groove for receiving the at least one protrusion. An advantage is that no separate sealing elements are needed because of the integrated sealing arrangement comprising the compatible protrusion and groove.

According to an embodiment, axial length of the sleeve-like support portion of the flange element is at least ¼ of the axial length of the accumulator. Then the support portion provides the membrane with proper support.

According to an embodiment, outer side surfaces of the sleeve-like support portion of the flange element are slanted towards a distal end of the support portion so that the support portion tapers towards the distal end. In other words, the shape of the support portion may correspond to the shape of a truncated cone. Then the slanted side surfaces provide axial support for the membrane when the hydraulic system is non-pressurized.

According to an embodiment, outer side surfaces of the sleeve-like support portion of the flange element are curved at least at their distal end portions. The curved surfaces are gentle to the membrane.

According to an embodiment, at a distal end portion of the sleeve-like support portion of the flange element is a central inwardly tapered portion extending a limited axial distance towards a mounting portion of the flange element, whereby the outermost portion of inner surfaces widen towards the distal end of the support portion.

According to an embodiment, the membrane is configured to close the mentioned pressure channels at the end of a discharge phase of the hydraulic space and is thereby configured to act as a non-return valve for the pressure channels. In other words, the membrane may prevent the hydraulic space to be totally discharged when the hydraulic space is non-pressurized. The remaining hydraulic fluid left inside the hydraulic space may support the membrane and may thereby prevent it to be stretched and worn. A further advantage is that no other valve means is needed when the membrane is provided with the non-return valve feature.

According to an embodiment, the pressure channels of the flange element are located at joint portion or root of the flange element, i.e. at a section where the annular mounting portion of the flange element changes to the support portion.

According to an embodiment, the pressure channels are axially directed. Then the channels are easy an inexpensive to manufacture.

According to an embodiment, number of the pressure channels is at least 12, but may be up to 24.

According to an embodiment, all the pressure channels are located on a same imaginary perimeter on the mounting portion of the flange element. According to an embodiment, the closed end of the membrane comprises a top surface portion facing towards the gas space. The top surface comprises an annular edge portion, a central portion and an annular recess portion between them. Further, according to an embodiment, all the mentioned portions, i.e. the edge portion, the central portion and the recess portion have curved cross-sections.

According to an embodiment, the membrane is provided with a curved connection portion with increased material thickness between the transverse mounting flange and the side surfaces. Thereby durability of the membrane may be improved.

According to an embodiment, the side walls of the membrane are angled relative to the axial central line of the accumulator. Thereby, the side walls open towards the open end of the membrane. The angled side walls may have positive affect to the controlled expansion movement of the membrane. They may also be advantageous for the durability of the membrane.

According to an embodiment, the membrane is made of elastic polyurethane (PU) material. Polyurethane has excellent mechanical properties and durability. Further, polyurethane has good fatigue resistance and it exhibits a large and reversible extensibility.

According to an embodiment, the membrane is made of other polymer or plastic material than polyurethane.

According to an embodiment, the membrane is made of rubber material, such as nitrile-rubber. An advantage of the rubber is that it provides good sealing properties because it may be relatively soft. Further, the nitrilerubber is inexpensive and endures well hydraulic oil.

According to an embodiment, an inner surface of the side wall of the membrane is provided with several ribs protruding inwardly towards an outer surface of the support portion of the flange element. The ribs keep the inner surface of the membrane at a short distance from an outer surface of the flange element whereby hydraulic fluid may flow between the support portion of the flange element and the membrane. The ribs may facilitate controlled operation of the membrane. Direction of the ribs may be substantially in the axial direction of the accumulator According to an embodiment, the solution relates to a hydraulic rock breaking machine, which may be a hydraulic breaking hammer or a rock drilling machine. The machine is provided with a percussion device or an impact device comprising a frame and a piston arranged inside the frame. The piston is configured to perform reciprocating longitudinal movement due to pressure of hydraulic fluid fed to the percussion device. A breaking tool or a drilling tool may be connected to the percussion device and may receive impact pulses from the percussion device. The percussion device has a hydraulic system comprising a feed port for feeding hydraulic pressure fluid into the percussion device and a discharge port for discharging the pressure fluid out of the percussion device. There are also needed pressure conduits for directing the pressure fluid to and out of working pressure spaces of the piston so that the piston can be moved in an impact direction and a return direction. A pressure accumulator is connected to the hydraulic system in order to store hydraulic pressure energy. The pressure accumulator is located at an extension of the piston so that an upper end of the piston moves inside the hydraulic space of the accumulator during the operation of the percussion device. The pressure accumulator comprises a casing, a membrane and a flange element, which are arranged successively in an axial direction of the percussion device. A top end portion of the piston is sealed to the flange element of the accumulator. Thus, there is a dynamic sealing between the flange element and the piston. Further, the flange element is also provided with pressure fluid conduits for feeding hydraulic fluid to the hydraulic space and for discharging the hydraulic fluid from the hydraulic space. Thus, the flange element may form a top end of the percussion device. Further, the pressure accumulator is without a screen and there is no mechanical fixed structure between the piston and the membrane in the axial direction of the accumulator. Thus, the top end of the piston is facing directly towards the inner surface of the membrane. The accumulator may further comprise the more detailed features disclosed in this document.

According to an embodiment, the membrane may contact a top end of the percussion piston when the percussion device is not pressurized.

According to an embodiment, top end of the percussion piston comprises a rounded edge. Then the piston is gentle to the membrane if or when they contact each other.

According to an embodiment, the hydraulic rock breaking machine, such as a hydraulic breaking hammer, comprises a high pressure circuit, a low pressure circuit and a tank pressure circuit. The disclosed accumulator is connected to a low pressure circuit. The low pressure circuit is continuously connected to a hydraulic space of the accumulator and the top end of the percussion piston is continuously affected by the low pressure of the low pressure circuit. The pressure of the low pressure circuit may be regulated by means of a valve. The low pressure circuit is also known as intermediate pressure circuit since its pressure is between the pressures of the high pressure circuit and the tank or discharge pressure circuit. Average operating pressure in the low pressure circuit may be 40 bar, for example.

According to an embodiment, the prefilling pressure inside the gas space is 15-20 bar. During the operation, the membrane compresses the prefilled gas and causes pressure increase in the gas space.

According to an embodiment, working cycle of the percussion device is controlled by means of a pressure controlled sleeve-like control valve which is arranged around the piston. A top part of the control valve extends inside the flange element of the accumulator. Then the flange element may be provided with control pressure channels.

According to an embodiment, the flange element may comprise a sleeve-like protrusion extending from the rear end of the percussion device towards the front end of the percussion device. Then the sleeve-like protrusion and the basic body of the percussion device may have an overlapping connection. The protrusion may provide support surfaces for a control valve of the percussion device.

According to an embodiment, the pressure accumulator is positioned only partly along its axial length around the percussion piston. The top end portion of the piston may move inside the hydraulic space of the accumulator, but does not pass through the accumulator, as it does in sleeve type accumulators.

According to an embodiment, the hydraulic space of the accumulator is connected to a hydraulic system of the percussion device and pressure fluid is configured to flow towards the hydraulic space and out of the hydraulic space during operation of the percussion device. Thus, the hydraulic space of the accumulator is subjected to a hydraulic fluid flow of the percussion device. In other words, the hydraulic space is not a closed pressure space provided with prefilled amount of hydraulic fluid, but instead the hydraulic fluid circulates therein.

According to an embodiment, the breaking machine further comprises at least one valve for adjusting pressure of the hydraulic fluid prevailing in the hydraulic system connected to the pressure accumulator. The valve may be configured to automatically adjust the pressure of the hydraulic space of the accumulator. The valve may be integrated to be part of the machine, or alternatively it may be a separate component outside the body of the machine.

According to an embodiment, the pressure inside the hydraulic space of the accumulator is 30-45 bar, typical average value is 40 bar. Thus, the accumulator is connected to a low or intermediate pressure circuit.

According to an embodiment, a top end of the percussion piston facing towards the hydraulic space of the accumulator is rounded. In other words, the top of the piston is shaped so that it has curved surfaces facing towards the inner surface of the membrane, whereby the piston in gentle for the membrane in case a contact between the piston and the membrane occurs when the machine is not hydraulically pressurized. Thereby, the piston cannot damage the membrane in any situation.

According to an embodiment, the piston is provided with a central protrusion for supporting the membrane against tension deformation when the machine is not pressurized and the membrane is subjected to forces of the pre-filled gas pressure. A top end of the mentioned protrusion may be curved or rounded so that it does not damage the membrane.

According to an embodiment, the method comprises controlling the hydraulic fluid flow from the hydraulic space by means of the membrane. Then the membrane serves as a non-return valve and it prevents the hydraulic fluid space to be totally discharged. Thanks to the non-return valve feature, harmful stretching of the membrane may be prevented when the hydraulic system is non-pressurized.

According to an embodiment, the solution relates to method of storing hydraulic pressure energy in a hydraulic breaking hammer or in a hydraulic rock drilling machine. The method comprises providing a percussion device of the hydraulic machine with at least one pressure accumulator comprising a gas space and a hydraulic space separated by means of a membrane. The method further comprises prefilling the gas space with pressurized gas and receiving a top end portion of a reciprocating piston of a percussion device of the breaking hammer inside the hydraulic space during operation of the percussion device. Then hydraulic volume inside the hydraulic space changes due to the protruding top end portion of the piston. The volumetric change in the hydraulic space is compensated by the accumulator by allowing the membrane to expand towards the gas space. The membrane has a hat-like configuration and it may have detailed features disclosed in this document. Further, the membrane is mounted by pressing a mounting flange, which is located at an open end of the membrane, axially between two axial mounting surfaces. A further idea is to leave the membrane without any support of a screen element.

According to an embodiment, the method comprises receiving hydraulic fluid to the hydraulic space from a hydraulic circuit of the rock breaking machine during operation of the rock breaking machine and correspondingly discharging the hydraulic fluid from the hydraulic space to the hydraulic circuit. In other words, the hydraulic fluid is circulated inside the hydraulic space whereby the hydraulic space is not a closed pressure space.

According to an embodiment, the method comprises pressing inner surfaces of the radial side walls of the hat-like membrane against outer surfaces of the support portion of the flange element under influence of the prefilling gas pressure when the percussion device of the rock breaking machine is inoperative and the hydraulic space is not pressurized. The membrane may also be pressed against the top surface of the piston for the same reason.

According to an embodiment, the method comprises adjusting hydraulic pressure prevailing inside the hydraulic space by means of a valve. The valve may set the pressure prevailing constantly in a low pressure system of the percussion device.

According to an embodiment, the method comprises using a membrane having a hat-like configuration. Mounting of the membrane comprises pressing a mounting flange, which is locating at an open end of the membrane, axially between two axial mounting surfaces. In other words, the membrane has an axial mounting system. The mentioned mounting surfaces are formed to the flange element and the casing. At the rear end side of the percussion device there is free space whereby handling of the components at the rear end side is easy.

Let it be mentioned that the disclosed pressure accumulator and pressure storing principles are also suitable for other types of percussion devices than those disclosed in this document.

The above-disclosed embodiments can be combined to form desired solutions provided with necessary features disclosed.

BRIEF DESCRIPTION OF THE FIGURES

Some embodiments are described in more detail in the accompanying drawings, in which.

For the sake of clarity, the Figures show some embodiments of the disclosed solution in a simplified manner. In the Figures, like reference numerals identify like elements.

DETAILED DESCRIPTION OF SOME EMBODIMENTS

Figure 1:
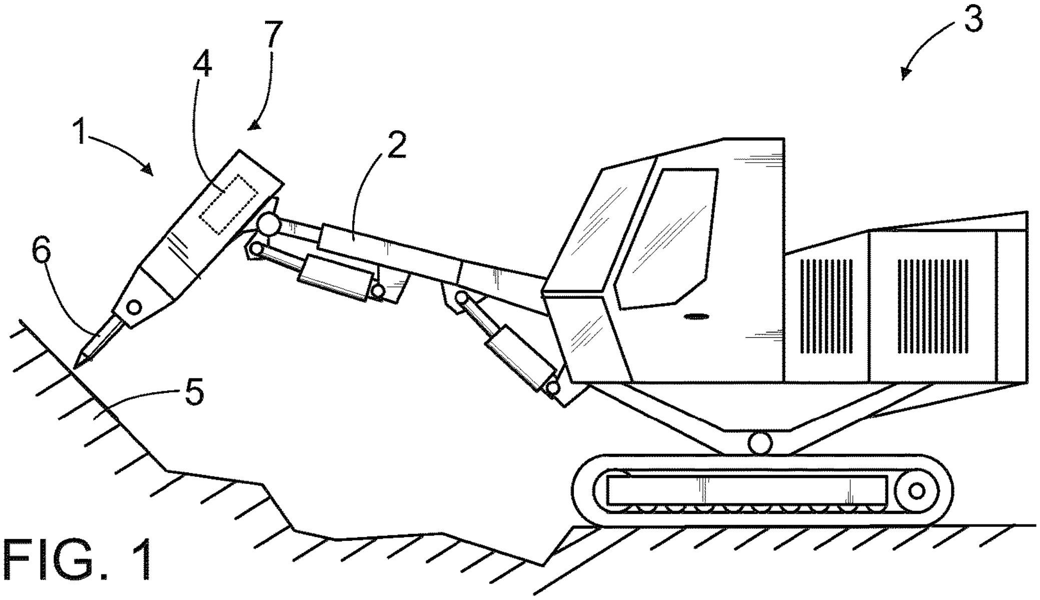
FIG. 1 is a schematic side view of an excavator, which is provided with a hydraulic breaking hammer.
Figure 3:
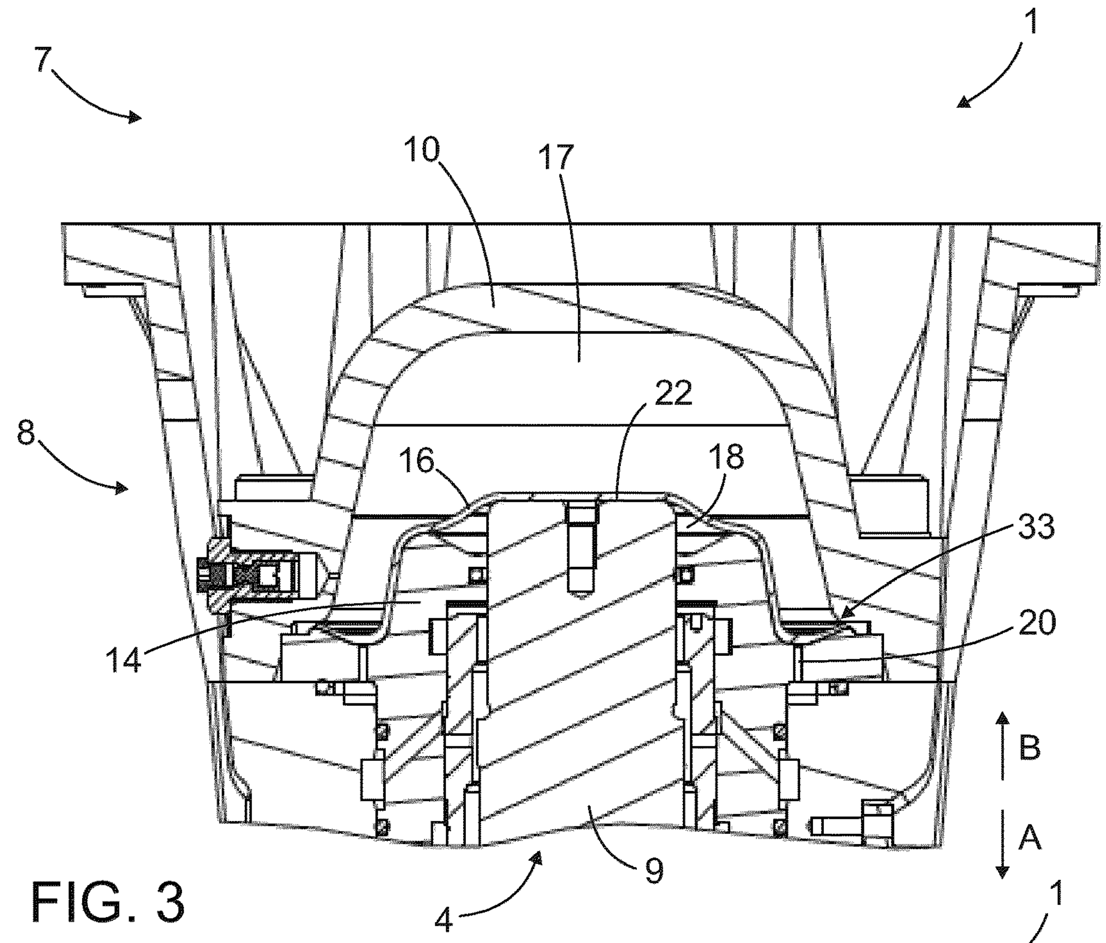
Figure 4:
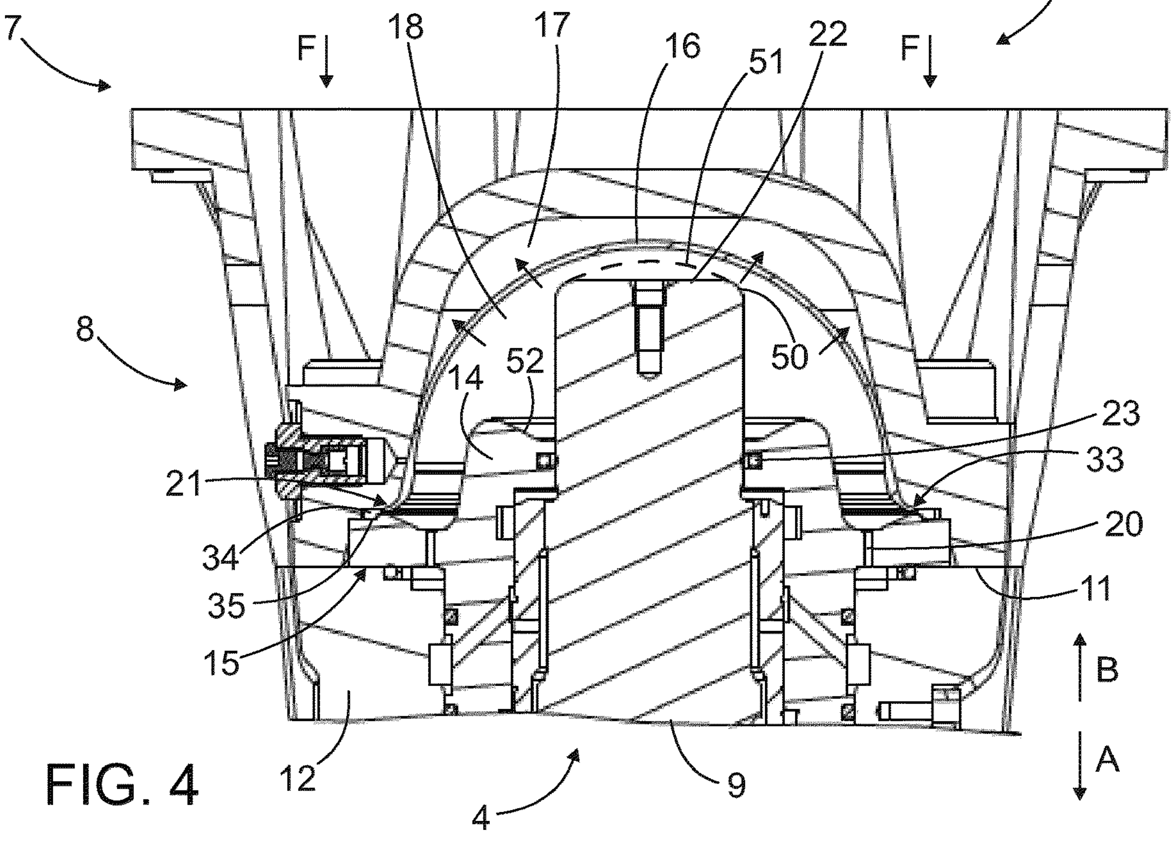

FIG. 1 shows a breaking hammer 1 arranged on a free end of a boom 2 of a working machine 3, such as an excavator. Alternatively, the boom 2 may be arranged on any movable carriage or on a fixed platform of a crushing apparatus. The breaking hammer 1 comprises a percussion device 4 for generating impact pulses. The breaking hammer 1 may be pressed by means of the boom 2 against material 5 to be broken and impacts may be simultaneously generated with the percussion device 4 to a tool 6 connected to the breaking hammer 1. The tool 6 transmits the impact pulses to the material 5 to be broken. The percussion device 4 is hydraulically operable, whereby it may be connected to the hydraulic system of the working machine 2. The impact pulses may be generated in the percussion device 4 by means of a percussion piston, which is moved back and forth in the impact direction and return direction under the influence of hydraulic fluid. At a rear end 7 of the breaking hammer is a hydraulic pressure accumulator, which is shown in FIGS. 2-4.

Figure 2:
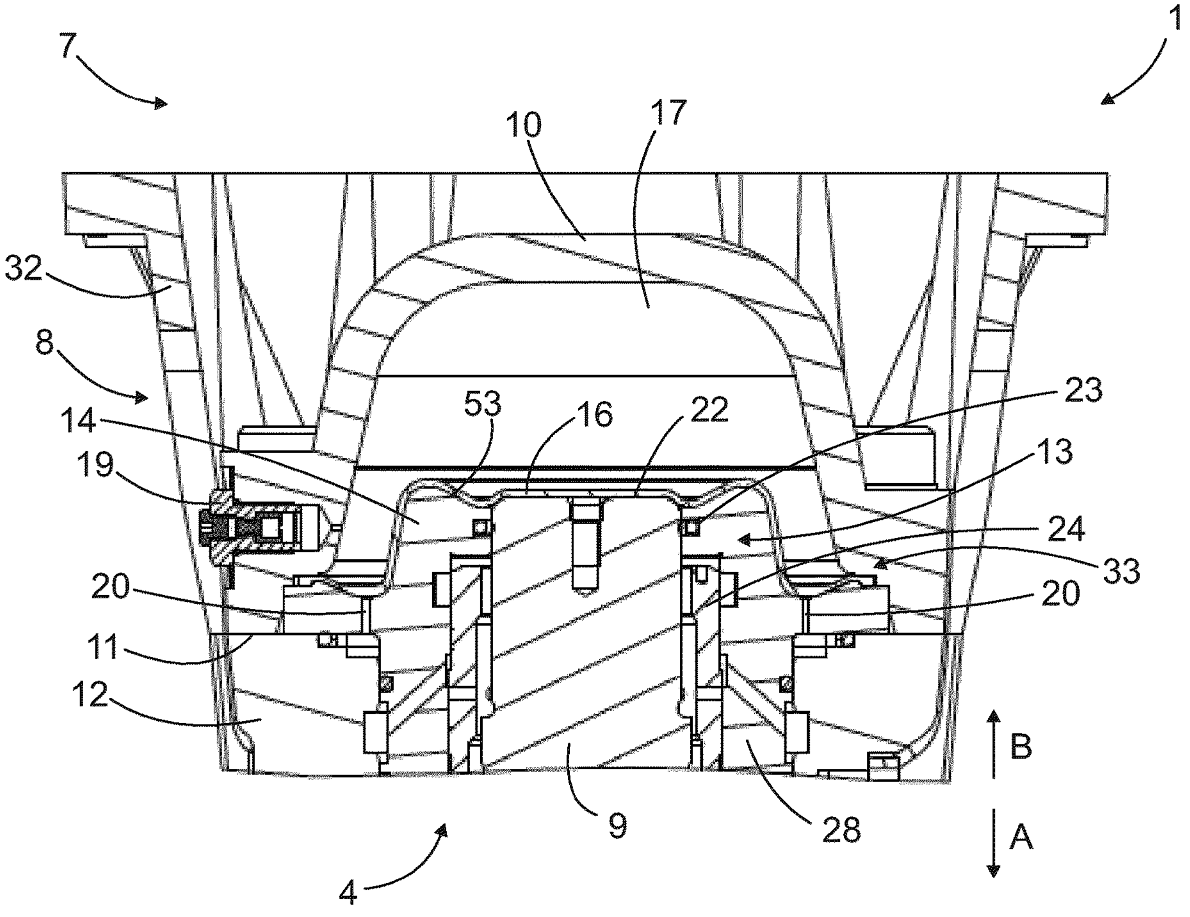
FIGS. 2-4 are schematic and sectional side views of a percussion device and its accumulator.

FIG. 2 discloses a rear end 7 or upper end portion of a breaking hammer 1. A hydraulic accumulator 8 is located at an extension of a percussion device 4, which comprises a piston 9 movable in impact direction A and return direction B. In FIG. 2 the piston 9 has executed its striking movement and is located in its lowermost position. The accumulator 8 comprises a casing 10 which is mounted against an axial mounting surface 11 of a body 12. The accumulator 8 further comprises a flange element 13, which may be pressed by means of fastening screws of the casing 10 against the mounting surface 11. Inside the accumulator 8 is an elastic membrane 16, edges of which are mounted between the casing 10 and the flange element 13. The membrane 16 divides the inner space of the casing 10 into a gas space 17 and a hydraulic space 18. The hydraulic space 18 is best shown in FIG. 4. As can be seen, the flange element 13 provides the membrane 16 with support. Inside the gas space 17 is pressurized gas. The casing 10 is provided with a feed port 19 for feeding pre-filling gas into the gas space 17. The hydraulic space 18 is connected to operating hydraulic system of the percussion device 4 via pressure channels 20. A top end 22 of the piston 9 moves inside the flange element 13 and causes volumetric change in hydraulic fluid inside the hydraulic space 18. The top end portion of the piston 9 is sealed by means of seals 23 to the flange element 13. Reciprocating movement of the piston 9 is controlled by means of a sleeve-like control valve 24 arranged around the piston 9 and provided with control surfaces for controlling hydraulic pressure affecting on working pressure surfaces of the piston 9. A first working pressure surface (not shown) is continuously pressurized and moves the piston 9 towards the return direction B. Hydraulic pressure affecting on a second working pressure surface and a third working pressure surface is controlled by means of the control valve 24. Working pressure surfaces are subjected selectively to hydraulic fluid flow of a high pressure circuit and tank pressure circuit. The top end 22 of the piston 9 is subjected continuously to low pressure since the accumulator 8 is connected to a low pressure circuit. When the control valve 24 connects working pressure surfaces to the high pressure circuit, then the piston 9 moves towards the impact direction A because surface areas of the working pressure surfaces are greater compared to the surface area of the first working pressure surface. Also the low pressure prevailing in the accumulator 8 and affecting on the top surface 22 generates forces for moving the piston 9 in the impact direction A.

FIG. 2 further discloses that the flange element 13 may comprise a sleeve-like portion 28 protruding towards the front end and surrounds the control valve 24. Then the flange element 13 is capable of providing support for the control valve 24 and is also provided with pressure channels.

Thanks to the sleeve-like portion 28 of the flange element 13 the structure of the basic body 12 may be simple. Different collars, fittings and pressure channels are easier to form to the separate component 13 than to the large-sized body 12.

FIG. 2 further discloses that the inner surface of the casing 10 and the membrane 16 both have shapes substantially corresponding to a shape of a hat. The casing 10 may comprise a protective sleeve 32 surrounding the accumulator 8.

In FIG. 2 the gas space 17 is prefilled with pressurized gas and the hydraulic space 18 is non-pressurized since the percussion device is not active. Therefore the gas pressure presses the membrane 16 against an outer surface of protruding support portion 14 of the flange element 13. As can be noted, central portion of the membrane 13 may then contact the top surface 22 of the piston 9 and also slanted surfaces of a recess 53 at a top of the support portion. In FIG. 3 the hydraulic space 18 is still non-pressurized, but the piston 9 has moved in return direction B because a tool of the breaking machine 1 is pressed against a material being broken.

In FIG. 4 the percussion device 4 is pressurized and the piston 9 is moved in return direction B to its rearmost position. Then hydraulic fluid is pushed by the piston 9 and the membrane 16 is forced towards the inner surface of the casing 10. Volume of the gas space 17 is decreased. Small arrows demonstrate that the membrane 16 expands axially and laterally during the return movement of the piston 9.

FIGS. 2-4 further show that edges 33 of the membrane 16 comprise an annular mounting flange 21, which is provided with a protrusion 34 facing towards a top surface of an annular mounting part 15 of the flange element 13. The mounting part of the flange element 13 is provided with a groove 35 or other form surface which may receive the protrusion 34 whereby they may together form a sealing element. Alternatively or in addition to, the protrusion 34 may be formed on the top side of the mounting flange 21 and the casing 10 may be provided with the groove 35. The accumulator 8 and all its components are mounted and dismounted in axial direction. The casing 10 is tightened by fastening screws against the rear mounting surface 11 of the body 12. Then the mounting flange 21 of the membrane 16 is pressed by axial force F tightly between axial counter surfaces of the casing 10 and the flange element 13.

FIG. 4 further discloses that top end 22 of the piston 9 may comprise rounded outer edges 50. Alternatively, the entire top end may have curved configuration 51.

FIGS. 2-4 also disclose that the pressure channels 20 are located at root portion of the flange element 13 and that the membrane 16 is arranged to close them when the prefilled gas pressure of the gas space 17 pushes the membrane 16 towards the flange element 13 and the hydraulic space 18 is non-pressurized. Then the membrane closes the pressure channels 20, as it is shown in FIGS. 2 and 3. In FIG. 4 the membrane 16 is in its expanded state and the pressure channels 20 are open, of course.

Figure 5:
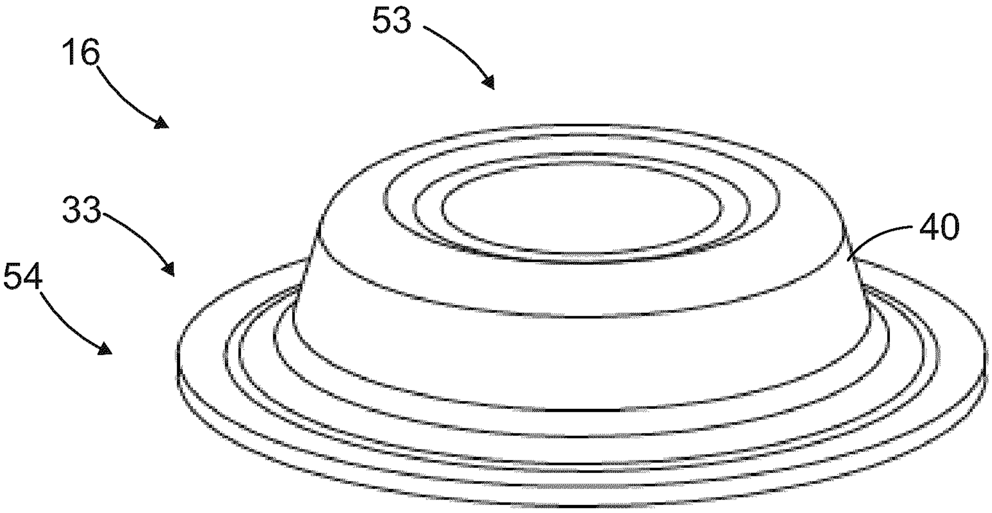
FIGS. 5-7 are schematic views of a hat-shaped membrane of an accumulator.
Figure 6:
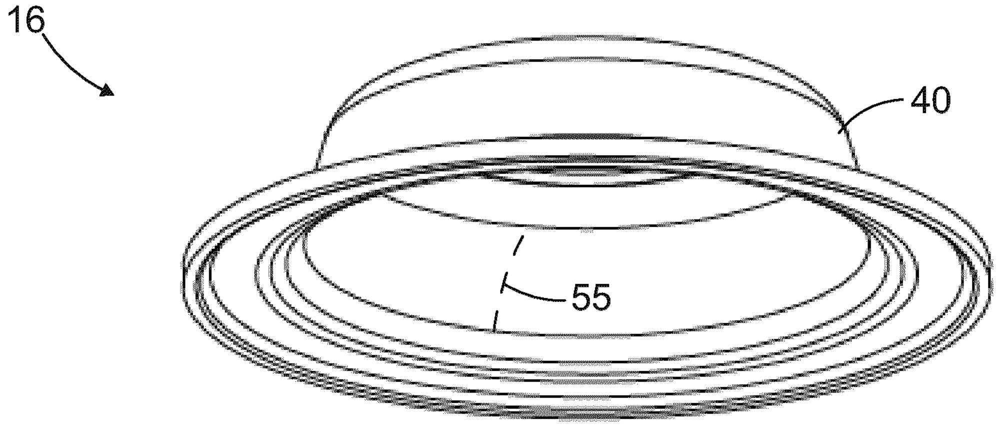
Figure 7:
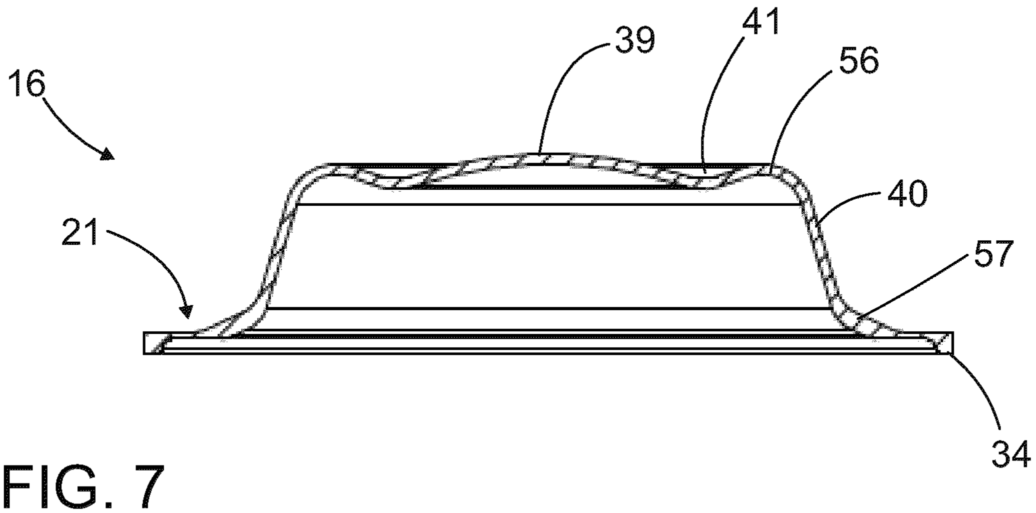

FIGS. 5-7 disclose a membrane 16 having a hat-like shape with a closed end 53 and an annular mounting flange 21 at an open end 54. Then edges 33 of the membrane 16 are provided with an annular transverse portion. The mounting flange 21 may comprise a protrusion 34 which may be a sealing bulge. Inside the membrane 16 may or may not be several ribs 55. The top end 53 of the membrane 16 may comprise a curved central portion 39. Between the top surface and the mounting flange 21 are angled side walls 40, and between the side walls and the top surface there is a curved intermediate portion 41 or recess. An annular edge 56 may be curved too. Further at a root portion there may be a curved section 57 with an increased material thickness. This part of the membrane 16 may serve as valve portion as it is disclosed above in this document. The shape of the membrane 16 may resemble a cowboy hat.

Figure 8:
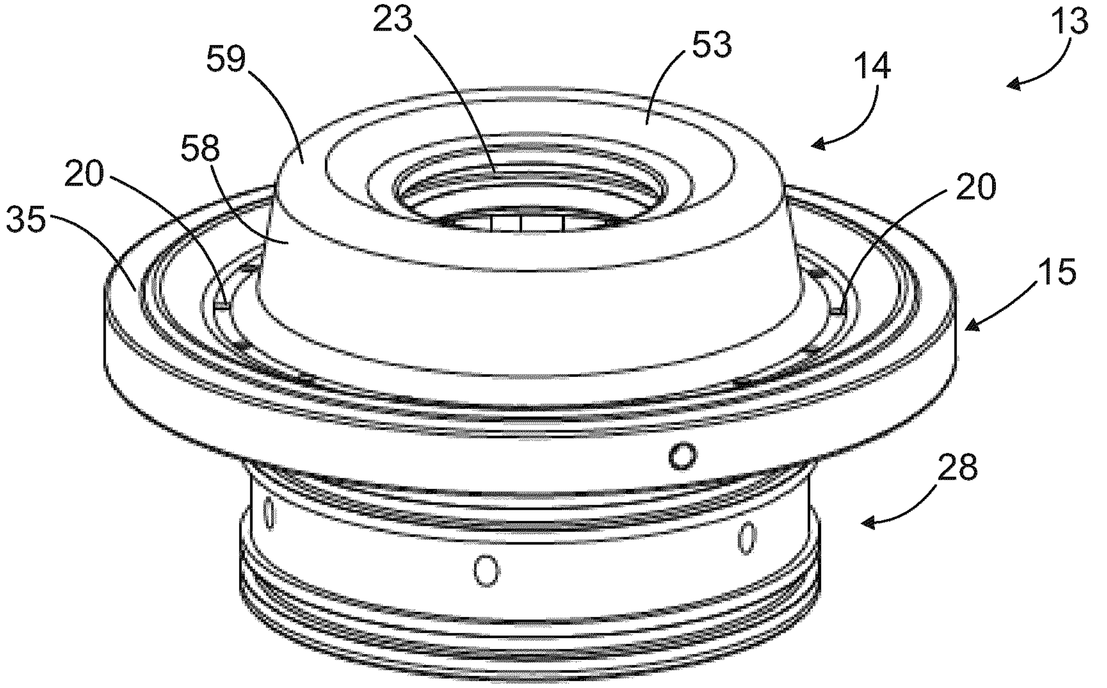
FIGS. 8 and 9 are schematic views of a flange element provided with a truncated support portion and a sleeve element.
Figure 9:
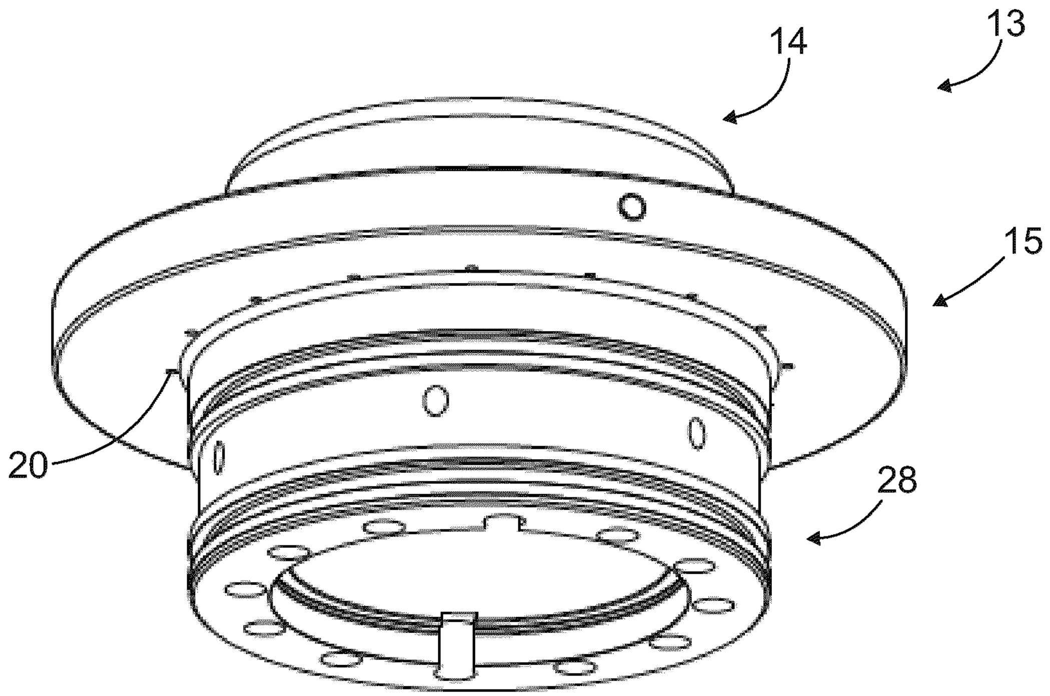

FIGS. 8 and 9 disclose a flange element 13 provided with an integrated support portion 14 and a sleeve-like portion 28. The disclosed flange element 13 is a multi-purpose component serving as an axial support membrane, as a mounting support for the membrane, and also providing needed control pressure channels and support for the control valve and operating system.

A top of the support portion 14 is open so that the piston can pass through it. Side surfaces 58 of the support portion 14 are slanted so that the support portion tapers towards it distal end. Outermost edge 59 is rounded. All the other features are already disclosed above in this document.

Figure 10:
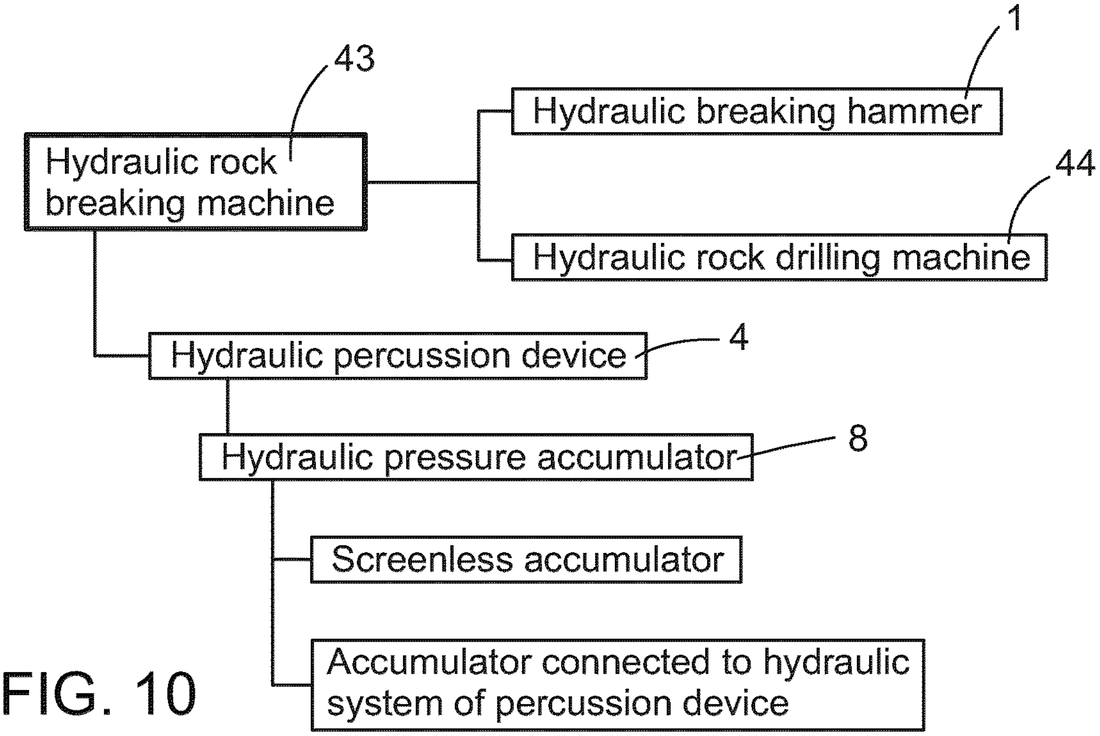
FIG. 10 is a diagram showing some issues relating to a hydraulic rock breaking machine.

FIG. 10 is a diagram showing that a hydraulic rock breaking machine 43 may be a hydraulic breaking hammer 1 or a rock drilling machine 44. Common features of these machines is at least the fact that they both include a hydraulic percussion device 4 and a hydraulic accumulator 8. Furthermore, they are used to break rock or rock material. Structure of the percussion device 8 and its detailed operational principle may deviate from what has been disclosed in FIGS. 2-4. Thus, the disclosed accumulator 8 may be applied versatile with different constructions.

Figure 11:
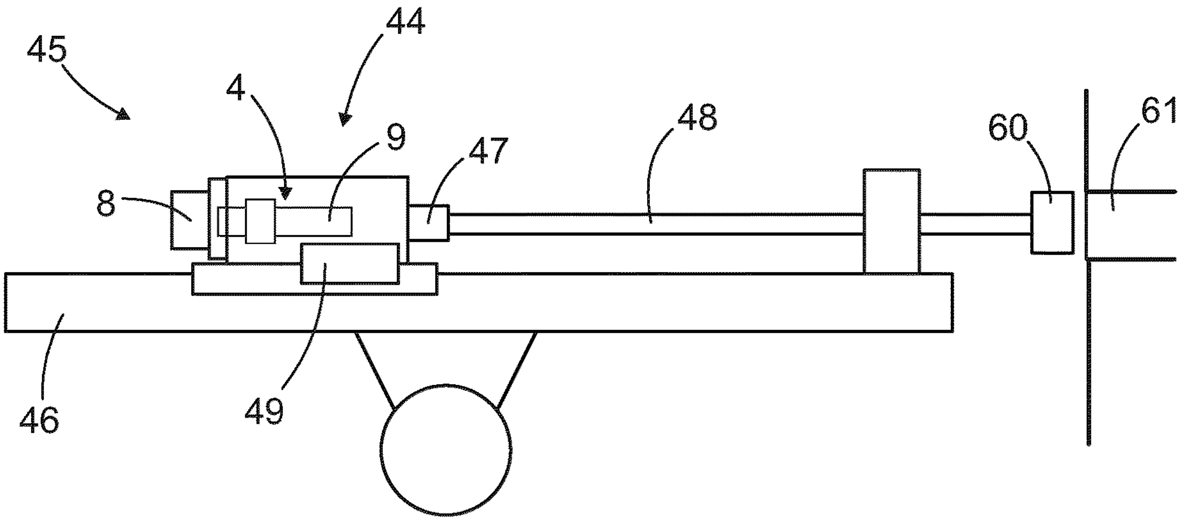
FIG. 11 is a schematic view of a rock drilling unit.

FIG. 11 discloses a rock drilling unit 45 comprising a rock drilling machine 44 supported movably on a feed beam 46. The rock drilling machine 44 comprises a percussion device provided with a reciprocating piston 9 arranged to strike an impact surface of a shank 47. A drilling tool 48 is connected to the shank 47 and the shank 47 may be rotated by means of a rotating device 49. When a drill bit 60 is pushed and simultaneously impact pulses are directed to the drilling tool 48, the drill bit crushes rock material and a drill hole 61 is formed. In order to compensate pressure fluctuation caused by the reciprocating movement of the piston 9, there is a hydraulic accumulator 8 at an axial extension of the percussion device 4. The accumulator 4 comprises a casing, a flange element and an elastic membrane between them. The basic structure of the accumulator 4 is in accordance with the features and issues disclosed in this document.

The drawings and the related description are only intended to illustrate the idea of the invention. In its details, the invention may vary within the scope of the claims.

The invention claimed is:

1. A hydraulic rock breaking machine, comprising:
- a percussion device including a frame and a piston arranged inside the frame and configured to perform reciprocating longitudinal movement due to pressure of hydraulic fluid fed to the percussion device;
- a tool connectable to the percussion device and configured to receive impact pulses from the percussion device;
- a hydraulic system of the percussion device, the hydraulic system including a feed port for feeding hydraulic pressure fluid into the percussion device and a discharge port for discharging the pressure fluid out of the percussion device, and pressure conduits for directing the pressure fluid to and out of working pressure spaces of the piston; and
- a pressure accumulator for storing hydraulic pressure energy and being connected to the hydraulic system, wherein the pressure accumulator is located at an extension of the piston so that an upper end of the piston moves inside a hydraulic space of the accumulator during the operation of the percussion device and wherein the accumulator comprises:

a casing defining an inner space;

an elastic membrane arranged inside the inner space and configured to divide the inner space into two separate pressure spaces, wherein a gas space is prefilled with pressurized gas, and on the opposite side of the membrane is a hydraulic space for receiving hydraulic fluid;

a flange element, wherein the membrane has radial side walls, edges at its open first axial end and a closed top end at its opposite second axial end, wherein the edges of the membrane are mounted between the casing and the flange element, the edges of the membrane having a transverse mounting flange, whereby the membrane has a hat-like configuration, the mounting flange, of the membrane is being pressed in an axial direction of the accumulator between the casing and the flange element;

the flange element including at least one pressure channel for feeding hydraulic fluid to the hydraulic space and for discharging hydraulic fluid, whereby the pressure channel allows provision of hydraulic fluid flow from a hydraulic operating system of the rock breaking machine to and out of the hydraulic space (18) during the operation of the machine;

the flange element including a central sleeve-like support portion protruding axially inside the casing, whereby an outer surface of the support portion is configured to provide axial support for the membrane at least when the hydraulic rock breaking machine is non-pressurized; and wherein an inner surface of the support portion of the flange element is provided with sealing elements for sealing an end portion of the piston.

2. The breaking machine as claimed in claim 1, wherein the flange element includes an annular mounting portion transverse to the axial direction of the accumulator, wherein the pressure channels are located at the mounting portion.

3. The breaking machine as claimed in claim 1, wherein the edges of the membrane are provided with at least one protrusion at least on one side of the membrane to serve as a sealing element, and wherein at least one of the axial mounting surfaces between the casing and the flange element is provided with a groove for receiving the at least one protrusion.

4. The breaking machine as claimed in claim 1, wherein an axial length of the sleeve-like support portion of the flange element is at least ¼ of an axial length of the accumulator.

5. The breaking machine as claimed in claim 1, wherein outer side surfaces of the sleeve-like support portion of the flange element are slanted towards a distal end of the support portion so that the support portion tapers towards the distal end.

6. The breaking machine as claimed in claim 1, wherein the top surface portion facing towards the gas space and the top surface includes an annular edge portion, a central portion and an annular recess portion therebetween.

7. The breaking machine as claimed in claim 1, wherein the side walls of the membrane are angled relative to the axial central line of the accumulator, whereby the side walls open towards the open end of the membrane.

8. The breaking machine as claimed in claim 1, wherein the hydraulic space of the accumulator is connected to the hydraulic system of the percussion device and pressure fluid is configured to flow towards the hydraulic space and out of the hydraulic space during operation of the percussion device.

9. The breaking machine as claimed in claim 1, further comprising at least one valve for adjusting pressure of the hydraulic fluid prevailing in the hydraulic system connected to the pressure accumulator.

10. The breaking machine as claimed in claim 1, wherein a top end of the percussion piston (9) facing towards the hydraulic space of the accumulator is rounded.

11. A method of storing hydraulic pressure energy of a rock breaking machine, the method comprising:

providing the rock breaking machine with at least one pressure accumulator in accordance with claim 1, the pressure accumulator including a gas space and a hydraulic space separated by a membrane, the membrane having a cup-like configuration provided with a closed top end, an open end and side walls between the ends;

prefilling the gas space with pressurized gas;

receiving a top end portion of a reciprocating piston of a percussion device of the rock breaking machine inside the hydraulic space during operation of the percussion device, whereby hydraulic volume inside the hydraulic space changes due to a protruding top end portion of the piston;

compensating the volumetric change in the hydraulic space by allowing the membrane to expand towards the gas space; and using the membrane;

using the pressure accumulator;

mounting the membrane by pressing a mounting flange, which is located at an open end of the membrane, axially between two axial mounting surfaces.

* * * * *